(12) United States Patent
McCarty et al.

(10) Patent No.: US 12,250,245 B2
(45) Date of Patent: *Mar. 11, 2025

(54) COOKIE COMPLIANCE MANAGEMENT

(71) Applicant: International Business Machines Corporation, Armonk, NY (US)

(72) Inventors: Richard James McCarty, Austin, TX (US); Ning Yan, Yorktown Heights, NY (US); Vishwas Chouhan, Oakland Garden, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/458,641

(22) Filed: Aug. 27, 2021

(65) Prior Publication Data

US 2021/0392168 A1 Dec. 16, 2021

Related U.S. Application Data

(63) Continuation of application No. 16/427,329, filed on May 30, 2019, now Pat. No. 11,122,086.

(51) Int. Cl.
*H04L 9/40* (2022.01)
*G06F 21/62* (2013.01)
*H04L 67/50* (2022.01)

(52) U.S. Cl.
CPC .......... *H04L 63/20* (2013.01); *G06F 21/6263* (2013.01); *H04L 67/535* (2022.05)

(58) Field of Classification Search
CPC ...... H04L 63/20; H04L 67/22; G06F 21/6263
See application file for complete search history.

(56) References Cited

U.S. PATENT DOCUMENTS

| 6,460,079 B1 | 10/2002 | Blumenau |
|---|---|---|
| 7,379,980 B1 | 5/2008 | Gilbert |
| 8,166,406 B1 | 4/2012 | Goldfeder |

(Continued)

OTHER PUBLICATIONS

List of IBM Patents or Applications Treated as Related, May 4, 2022.

(Continued)

*Primary Examiner* — Viral S Lakhia
(74) *Attorney, Agent, or Firm* — Rakesh Roy

(57) ABSTRACT

A cookie compliance management system enables automated evaluation of cookie compliance within an enterprise. The system determines whether a cookie set by an application in the environment is compliant with a policy. It comprises a workflow engine, a cookie discovery engine (CDE), a cookie characterization engine (CCE), a cookie policy engine (PE), and a cookie registry. The workflow engine receives a request to initiate an evaluation of an application for cookie compliance. The CDE is invoked and returns cookies that are set by the application. The CCE receives a set of base attributes associated with a cookie discovered by the CDE, and computes a set of descriptive attributes determined to be required to enable evaluation of the cookie according to a policy. The policy engine receives policy rules and the set of descriptive attributes and, in response, determines whether the cookie is compliant with the policy. The cookie registry stores cookie data.

21 Claims, 8 Drawing Sheets

(56) References Cited

U.S. PATENT DOCUMENTS

| | | | |
|---|---|---|---|
| 8,448,233 B2* | 5/2013 | Shulman | H04L 63/1425 |
| | | | 713/176 |
| 8,578,036 B1* | 11/2013 | Holfelder | G06F 21/6263 |
| | | | 709/224 |
| 8,707,026 B2 | 4/2014 | Wicker | |
| 8,763,120 B1* | 6/2014 | Forristal | G06F 21/567 |
| | | | 726/26 |
| 8,788,617 B2* | 7/2014 | Cardozo | G06F 16/955 |
| | | | 709/217 |
| 9,075,990 B1* | 7/2015 | Yang | H04L 63/20 |
| 9,087,216 B2* | 7/2015 | LaFever | H04L 63/0414 |
| 9,350,644 B2* | 5/2016 | Desai | H04L 63/1433 |
| 9,667,747 B2* | 5/2017 | Stevens | H04L 67/01 |
| 9,858,439 B1* | 1/2018 | Beaumont | H04L 63/102 |
| 10,013,577 B1 | 7/2018 | Beaumont | |
| 10,021,194 B2* | 7/2018 | Bolger | H04L 63/0281 |
| 10,142,440 B2* | 11/2018 | Diamanti | H04L 67/01 |
| 10,277,612 B2* | 4/2019 | Marzorati | H04L 67/02 |
| 10,489,581 B2* | 11/2019 | Xu | H04L 63/1425 |
| 10,547,627 B2* | 1/2020 | Xu | H04L 63/1425 |
| 10,565,106 B2* | 2/2020 | Doleh | G06F 16/972 |
| 10,630,480 B2* | 4/2020 | Gaetjen | H04L 63/0876 |
| 10,693,901 B1* | 6/2020 | Chan | H04L 67/02 |
| 10,728,267 B2* | 7/2020 | Lee | G06F 21/554 |
| 10,733,323 B2* | 8/2020 | Ford | H04L 67/146 |
| 10,860,723 B1* | 12/2020 | Blitz | G06F 21/602 |
| 10,897,458 B1 | 1/2021 | Coral | |
| 10,909,069 B2* | 2/2021 | Haviv | G06F 3/0649 |
| 10,931,674 B2* | 2/2021 | Lerner | G06Q 30/0269 |
| 11,122,086 B2 | 9/2021 | McCarty et al. | |
| 11,449,637 B1* | 9/2022 | Sanchez Rola | G06F 21/6245 |
| 2004/0049673 A1 | 3/2004 | Song et al. | |
| 2008/0222270 A1 | 9/2008 | Gilbert | |
| 2009/0193129 A1 | 7/2009 | Agarwal et al. | |
| 2011/0214163 A1 | 9/2011 | Smith et al. | |
| 2012/0036178 A1 | 2/2012 | Gavini et al. | |
| 2016/0197962 A1* | 7/2016 | Winn | H04L 63/0823 |
| | | | 713/168 |
| 2016/0381061 A1* | 12/2016 | Vanunu | H04L 63/1433 |
| | | | 726/25 |
| 2017/0093917 A1* | 3/2017 | Chandra | H04L 63/20 |
| 2017/0104687 A1* | 4/2017 | Peterson | H04L 51/212 |
| 2018/0041589 A1 | 2/2018 | Bolger et al. | |
| 2019/0190958 A1* | 6/2019 | Blitz | H04L 63/20 |
| 2020/0380176 A1 | 12/2020 | Pauley, Jr. et al. | |
| 2021/0243229 A1* | 8/2021 | Kim | H04L 63/1425 |

OTHER PUBLICATIONS

Damianou et al., "The Ponder Policy Specification Language", Proc. Policy 2001: Workshop on Policies for Distributed Systems and Networks, Bristol, UK, Jan. 29-31, 2001, Springer-Verlag LNCS 1995, pp. 18-39.

Disclosed Anonymously, "Method and system for risk based cookie management", An IP.com Prior Art Database Technical Disclosure, IP.com No. IPCOM000219380D, IP.com Electronic Publication Date: Jun. 27, 2012, 4 pages.

Google Chrome, "Cookie Compliance Audit Tool", Accessed on Oct. 27, 2023, 6 pages.

OneTrust, "Trust Intelligence Cloud Solutions", accessed on Oct. 27, 2023, 15 pages.

OneTrust, Cookie Consent, "Simplify cookie compliance and consent management", accessed on Oct. 27, 2023, 7 pages.

TrustArc., "Cookie Consent Management Software & Tool", accessed on Oct. 27, 2023, 10 pages.

Usercentrics Cookiebot, "Is my website compliant?", accessed on Oct. 27, 2023, 1 page.

List of IBM Patents or Patent Applications Treated as Related, Oct. 27, 2023, 2 pages.

* cited by examiner

1100 {
Name: MyCookie
Content:
ZX1KMGVYQW1PaUpLVjFRaUxDSmhiR2NpT21KSVV6STFOaUo5LmV5SnBjM01p
T21KS1FrMG1MQ0pwWVhRaU9qRTFNekV4T1RRME56Z3NJbVY0Y0NJNk1UVTJN
amN6TURRM09Dd21ZWFZrSWpvaV1XSmpRWEJ3SW13aWMzVm1Jam9pYW05bGR
HVnpkR1Z5UUhoNWVucDVMbU52Y1NJc01rZHBkbVZ1VG1GdFpTSTZJa3B2W1Nc
01sTjFjbTVobY1dVaU9pS1VaWE4wW1hJaUxDS1FhRz11W1NJNk1pc3hPVEExT1RVMU1
USXhNaU1zSWtWdF1XbHNJam9pYW05bGRHVnpkR1Z5UUhoNWVucDVMbU52Y1
NKOS5TZktneU1rRUwwdEVsTDI4ZU1ONnE3NkRKaVBsTjVhSGsyVm9HYWxMeT
hj
Expires: July 9, 2019, 8:53:56 PM
Path: /
Domain: xyzzy.com
Flags: Secure, HTTPOnly|
}

1102 {
eyJ0eXAiOiJKV1QiLCJhbGciOiJIUzI1NiJ9.eyJpc3MiOiJJQk0iLCJpYXQiOjE1MzExOTQ
0NzgsImV4cCI6MTU2MjczMDQ3OCwiYXVkIjoiYWJjQXBwIiwic3ViIjoiam91dGVzdGV
yQHh5enp5LmNvbSIsIkdpdmVuTmFtZSI6IkpvZSIsIlN1cm5hbWUiOiJUZXN0ZXIiLCJQa
G9uZSI6IisxOTA1NTU1MTIxMiIsIkVtYWlsIjoiam91dGVzdGVyQHh5enp5LmNvbSJ9.Sf
KgyMkEL0tE1L28eIN6q76DJiP1N5aHk2VoGa1Ly8c
}

1104 — {"typ":"JWT","alg":"HS256"}

1106 {
{"iss":"IBM","iat":1531194478,"exp":1562730478,"aud":"abcApp","sub":"joetester@xyzzy.
com","GivenName":"Joe","Surname":"Tester","Phone":"+19055551212","Email":"joetester
@xyzzy.com"}
}

FIG. 11

- Type: Persistent
- Content
  - Value:
    ZX1KMGVYQW1PaUpLVjFRaUxDSmhiR2NpT21KSVV6STFOaUo5LmV5SnB
    jM01pT21KS1FrMG1MQ0pwWVhRaU9qRTFNekV4T1RRME56Z3NJbVY0Y0
    NJNk1UVTJNamN6TURRM09Dd21ZWFZrSWpvaV1XSmpRWEJ3SW13aWMz
    Vm1Jam9pYW05bGRHVnpkR1Z5UUhoNWVucDVMbU52Y1NJc01rZHBkbVZ1
    VG1GdFpTTZJa3B2W1NJc01sTjFjbTVoY1dVaU9pS1VaWE4wW1hJaUxDS1Fh
    Rz11W1NJNk1pc3hPVEExT1RVMU1USXhNaU1zSWtWdF1XbHNJam9pYW05b
    GRHVnpkR1Z5UUhoNWVucDVMbU52Y1NKOS5TZktneU1rRUwwdEVsTDI4
    ZU1ONnE3NkRKaVBsTjVhSGsyVm9HYWxMeThj
  - Length: 428 bytes
  - Encoding: B64
  - ContentType: SecurityToken
    - TokenType: JWT
    - TokenData: PlainText
    - TokenLifetime: 1 year
  - ContentHasPD: True
  - Secure: False
  - HTTPOnly: False
  - Encoding: NoneDetected
  - ContentType: RandomIdentifier
  - ContentHasPD: False

FIG. 12

1300
- Name:
  - Value: MyCookie
  - Length: 8
- Source: appA
  - Type: Persistent
  - Lifetime: 7 days
  - Content:
    - Value: 34FGh7u2wx
    - Length: 10
  - Path: /
  - Domain: myhost.xyzzy.com
  - Secure: False
  - HTTPOnly: False
  - Encoding: NoneDetected
  - ContentType: RandomIdentifier
  - ContentHasPD: False 1302
- Name:
  - Value: MyCookie
  - Length: 8
- Source: appB
  - Type: Session
  - Lifetime: 0
  - Content
    - Value: 18470338-8410-11e8-8d53-2f84851de22e
    - Length: 36
  - Path: /
  - Domain: xyzzy.com
  - Secure: True
  - HTTPOnly: False
  - Encoding: NoneDetected
  - ContentType: UUID
  - ContentHasPD: False

FIG. 13

COOKIE COMPLIANCE MANAGEMENT

BACKGROUND OF THE INVENTION

Technical Field

This disclosure relates generally to information security in an enterprise computing environment.

Background of the Related Art

HTTP cookies present several issues to organizations with extensive, diverse applications and infrastructure. They are regularly used in the context of security (session management/CSRF prevention, etc.), personalization, and site/server stickiness, among other things. Recently, cookies have recently gained substantial focus related to privacy. In this regard, their use often presents many concerns, especially in large enterprise scenarios, and the impacts of such can be underestimated.

First, there can be important security and privacy concerns that arise with respect to cookie values and settings. Cookies represent a significant attack surface. When using cookies for storing information, especially data related to a user's authenticated session, key vectors must be addressed. Incorrect settings for sensitive cookies can lead to a variety of security exposures. Also, GDPR, the recently-enacted European Union law, as well as other emerging privacy regulations, drive the need to assure that user personal data is handled appropriately, and further that user consent is obtained for certain categories of cookies. For these reasons, it is now important that enterprises have a broader awareness about the cookies being set when users access applications, including their actual content values, lifetimes and other aspects.

Second, often there are internally-driven needs to assure that cookies do not present technical problems for the application infrastructure. Cookie "collisions" are not uncommon, especially where multiple applications within a domain use the same name/path for a cookie, yet with application-specific values. This can result in a variety of difficult-to-diagnose failure conditions, and this scenario is most commonly remedied by simply telling users to "delete their cookies"—often an unsatisfactory solution.

A third problem involves the sheer quantity of cookies within a common web domain shared across a large set of applications, a problem often exacerbated by the use of lengthy cookie values and/or names. In organizations with large numbers of applications and services under a common domain, a substantial number of cookies can be set as users navigate across them; this is especially the case with session and various transient cookies. This situation can result in header size failures at origin web servers and/or proxy servers. Other than increasing maximum sizes in server configurations, enterprises often address this problem by once again telling affected users to "delete their cookies."

The above-described issues commonly arise within an enterprise Information Technology (IT) infrastructure, especially as the size of the enterprise increases and/or the nature of the infrastructure is diverse. Indeed, security exposures relating to incorrect settings are common. Often, there are regular instances of cookie collisions and non-compliant cookies that result difficult-to-explain application behaviors, or that even lead to breaking certain application features. Regulatory compliance is also a critical requirement, and while steps can be undertaken to support required end user consent/transparency, known approaches do not provide for comprehensive compliance views.

There remains a need to enable efficient discovery of how cookies are used for web applications across an enterprise, and to determine whether they are being used in compliance with organizationally-relevant standards.

BRIEF SUMMARY

A cookie compliance management system is provided to enable automated evaluation of cookie compliance within an enterprise computing environment. In one embodiment, the system comprises a set of components that operate to determine whether a cookie set by an application in the environment is compliant with a policy, e.g., an industry standard, a legal restriction, an enterprise-specific cookie handling policy or the like. To this end, the system comprises a workflow engine, a cookie discovery engine, a cookie characterization engine, a cookie policy engine, and a cookie registry. The workflow engine is configured to receive a request to initiate an evaluation of an application for cookie compliance. The cookie discovery engine is configured to receive a request to initiate cookie discovery against the application. Typically, the request to initiate is invoked by the workflow engine in response to receipt of the request. The cookie discovery engine returns one or more cookies that are set by the application during its usual (or anticipated) operations. The cookie characterization engine is configured to receive a set of base attributes associated with a cookie discovered by the cookie discovery engine, and to compute a set of one or more descriptive attributes. Typically, the descriptive attributes are those that are determined to be required to enable evaluation (by the policy engine) of the cookie according to a policy. The cookie policy engine is configured to receive one or more policy rules and the set of descriptive attributes and, in response, to determine whether the cookie is compliant with the policy. The cookie registry is provided to store the cookie, the set of base attributes, the set of descriptive attributes, and a compliance determination.

Taken together, these components provide a robust and scalable management framework that enables autonomous discovery of how cookies are (or will be) used for applications across the enterprise, and to provide an indication whether such cookies are being (or will be) used in compliance with applicable enterprise security policy.

The foregoing has outlined some of the more pertinent features of the invention. These features should be construed to be merely illustrative. Many other beneficial results are attained by applying the disclosed invention in a different manner or by modifying the invention as will be described.

BRIEF DESCRIPTION OF THE DRAWINGS

For a more complete understanding of the subject disclosure and the advantages thereof, reference is now made to the following descriptions taken in conjunction with the accompanying drawings, in which:

FIG. 11 depicts a first example scenario involving an obfuscated security token;

FIG. 12 depicts a cookie characterization provided by the CCE with respect to the cookie in FIG. 11; and FIG. 13 depicts a second example scenario involving a cookie collision scenario.

DETAILED DESCRIPTION

Figure 1:
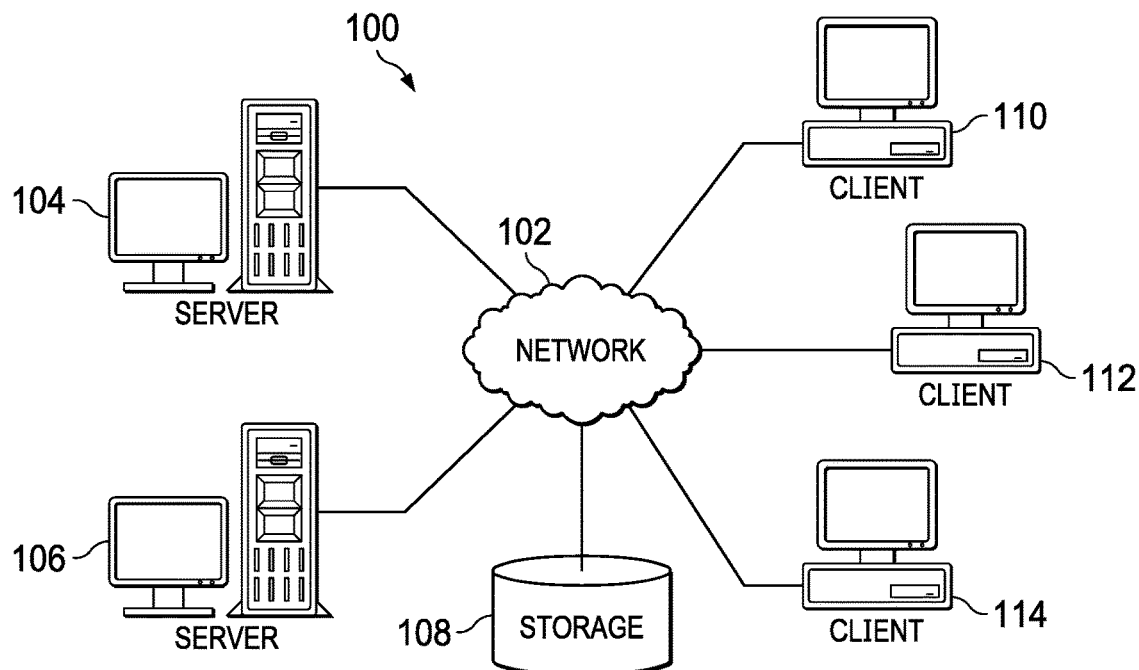
FIG. 1 depicts an exemplary block diagram of a distributed data processing environment in which exemplary aspects of the illustrative embodiments may be implemented.
Figure 2:
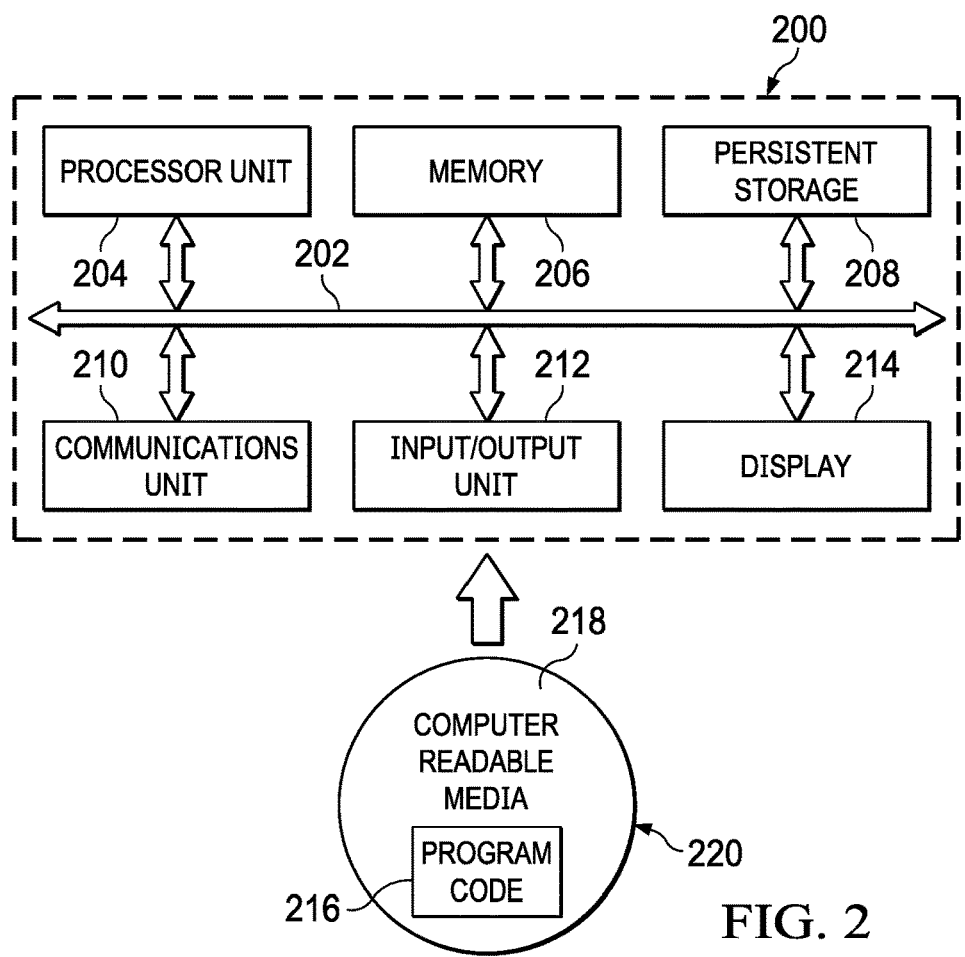
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C or the like, and conventional procedural programming languages, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with a network-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
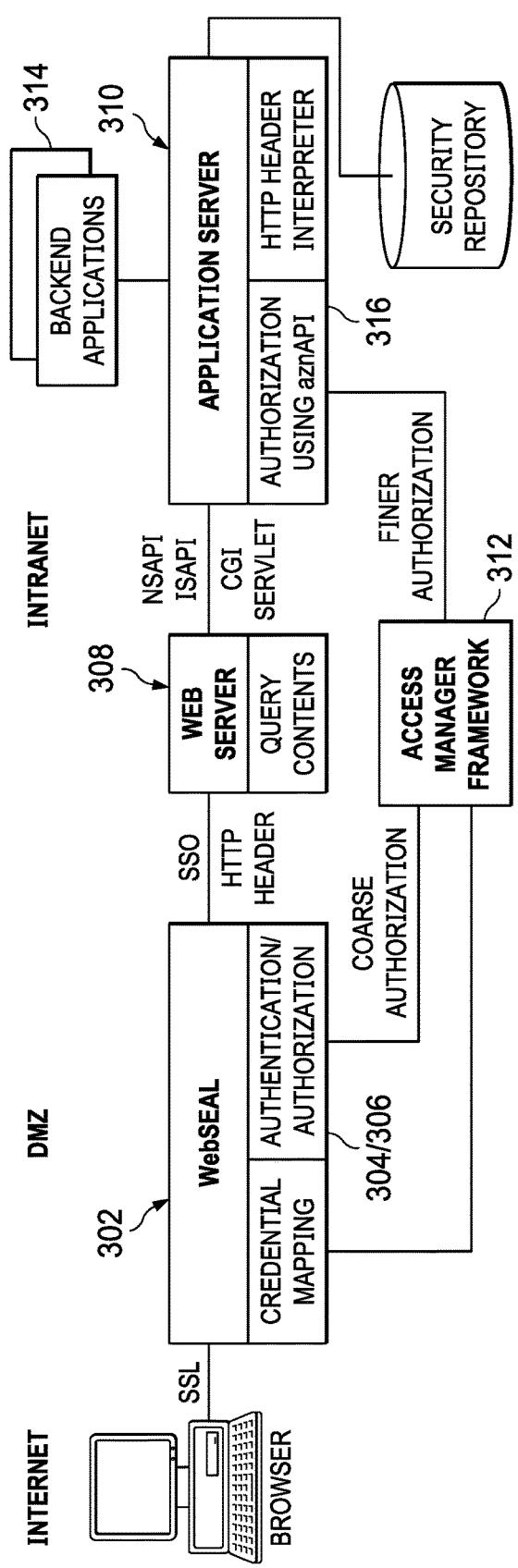
FIG. 3 illustrates a known Web portal having an access management framework in which the subject disclosure may be implemented.

By way of further background, enterprise applications are commonly implemented as web applications. Techniques for managing secure session-based client access to such web applications also are known in the art. FIG. 3 depicts a representative implementation (which is not limited to the enterprise application use case). In this example, session management typically is provided in association with an access manager, which is a component that prevents unauthorized use of resources, including the prevention of use of a given resource in an unauthorized manner. A representative access manager is the IBM Security Access Manager (ISAM) product, which is available commercially from IBM®, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 in particular illustrates how ISAM is integrated in a Web portal to provide authorization and access control services for Web resources. A high performance, multi-threaded Web server 302 (called WebSEAL in the figure), an ISAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

ISAM provides a reverse proxy, web plug-in or the like that provides session management functionality and that includes authorization functionality as part of this session management. Authentication is handled by ISAM, meaning that ISAM collects a user's authentication credentials, evaluates them, and establishes a session, including some form of session management functionality (such as a session cookie). To provide a user with the advantages of this consolidated environment, ISAM then provides a single sign-on solution for the user by asserting authentication credentials (such as username/password) to the back-end applications. This allows the back-end application to be added to the portal environment without modification.

Figure 4:
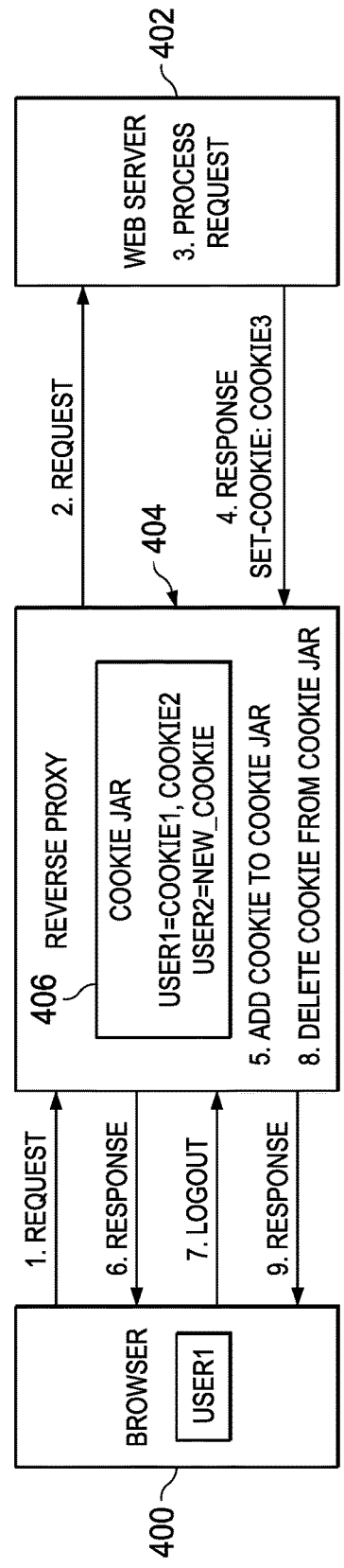
FIG. 4 is a simplified block diagram of a web browser interacting with a backend application through a reverse proxy that stores cookies in a session cache.

FIG. 4 is a simplified block diagram showing an example information flow for session management in a proxy environment, such as shown in FIG. 3. In this example, a first user (User1) of web browser 400 has established an existing authentication session with backend web server 402 using the reverse proxy 404, such as ISAM. The proxy includes a session cache 406 (or "cookie jar") that is instantiated on a per-user session basis. In step (1), the first user uses the web browser 400 to make an HTTP request to the web server 402 via the reverse proxy 404. The reverse proxy 404 receives the request and, at step (2), passes it to the web server 402. The web server 402 process the request at step (3). At step (4), the web server 402 returns a response to the reverse proxy 404 containing a Set-Cookie HTTP header. At step (5), the reverse proxy 404 detects the Set-Cookie header and adds the cookie to its cookie jar 406 for the authenticated user (in this case, used). At step (6), the reverse proxy sends the response back to the web browser 400 but removes the 'Set-Cookie' header. Thus, in this prior art approach, typically the cookie is not returned to the web browser. Thereafter, assume that the first user then uses the browser to log out of the session it has with the reverse proxy 404. This is step (7). At step (8), the reverse proxy 404 accesses the cookie jar to determine whether to delete any cookies. At step (9), the reverse proxy 404 returns a logout response to the browser. The reverse proxy then completes other session cleanup activities.

Generalizing, an enterprise computer environment in which the techniques of this disclosure may be practiced typically is implemented across one or more machines, such as shown in FIG. 2, operating in a computing environment, such as shown in FIG. 1. An enterprise application may be accessible via the Web, in which case an access control system such as described with respect to FIGS. 3 and 4, may be used. One or more components may be located on-premises, or supported in a cloud environment.

A representative operating scenario in which the techniques of this disclosure may be implemented is now described. This scenario is not intended to be taken to limit the subject matter herein. In this example, enterprise is an organization with a top-level domain, e.g., "someorganization.com," a large number of applications integrated through the common subdomain, e.g., "www.someorganization.com" via a content delivery network or the like, and multiple other subdomains used for various purposes. In this scenario, and as depicted in FIG. 4, it is assumed that any application in any subdomain can set a cookie for its own subdomain, or for the top-level domain. Because all top-level cookies are passed on to all subdomains, this means that an application operating within any subdomain context can set cookies that may then affect applications or services operating within other subdomains. Further, within a given subdomain, any application's cookies can affect other applications or services within the domain. In this operating environment, when an issue occurs, it can be challenging to determine what application or service is setting a particular cookie, making problem determination or compliance enforcement difficult. As the size of the enterprise environment increases, the problem is exacerbated.

With the above as background, the technique of this disclosure is now described. As mentioned, the approach here in provides for tooling to track the use and compliance of cookies within computing environments (e.g., large enterprises), such as described above. As will be seen, the approach does not interfere with the ability of cookie-setting applications to have freedom to create the cookies they need to successfully function, including doing so in a way that minimizes the possibility of interference with cookies set by another application or service, creating security exposures, or running afoul of government regulations.

Cookie Compliance Management

According to this disclosure, a cookie compliance management solution comprises a set of functions, namely, a "discovery" capability that is configured to operate in association with a "registry" and a policy engine. Preferably, the process and flow of data across these components is managed through an additional "orchestrator" component that is also a component of the management solution. In a typical implementation, and as will be described, the discovery capability is supported in association with a browser (emulated or actual) interface, and preferably as an ability to capture cookies as they are being set (either through Javascript or via a standard "Set-Cookie" HTTP header). Generally, the discovery capability "discovers" cookies that have been (or are being set) by an application. The discovery component includes the ability to access and capture cookie name and value, but also other settings (such as expiration and domain) that are typically only retained within the browser. The cookie "registry" provides for the ability to associate discovered cookies with their sources, and to record cookie compliance against policies. The cookie registry typically also includes the ability to associate specific "classifications" of cookies with cookie consent functions. Generally, the policy engine is configured to encapsulate applicable cookie policies into a form that can be evaluated against actual cookie instances, as well as the ability to evaluate a specific cookie instance in combination with cookie repository information against the cookie policies to determine compliance level. Generally, the orchestrator component manages the overall process flow for evaluating cookie compliance, as well as managing data flows among components.

Figure 5:
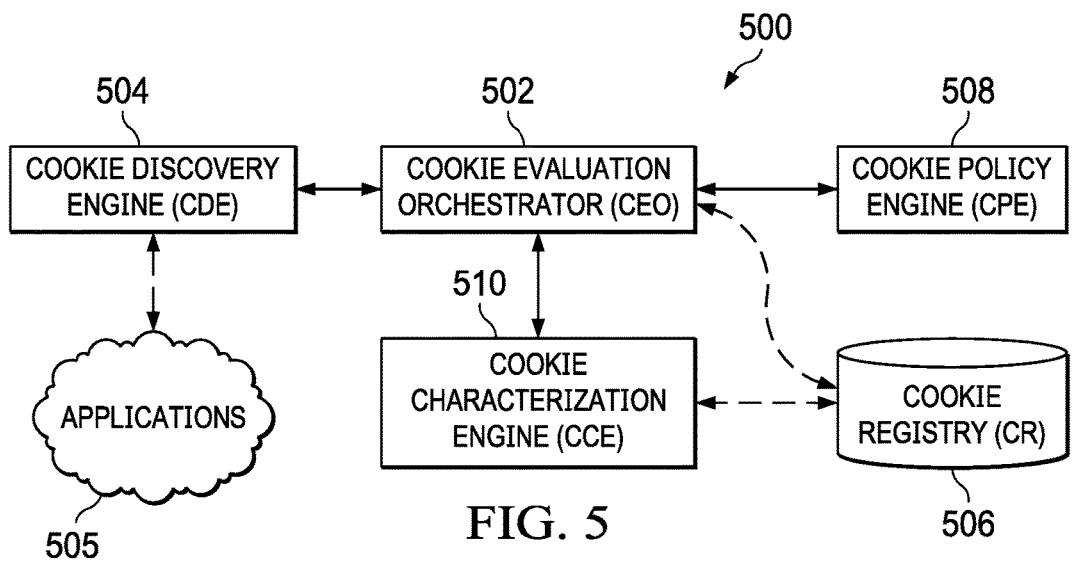
FIG. 5 is a high level block diagram of a cookie compliance management system of this disclosure.

FIG. 5 illustrates an embodiment of these cookie compliance management system 500. As depicted, preferably the solution comprises a set of components, which typically are implemented as software executing in hardware (physical or virtual). The management system 500 comprises a cookie evaluation orchestrator (CEO) 502, a cookie discovery engine (CDE) 504, a cookie registry (CR) 506, a policy engine (PE) 508, and a cookie characterization engine (CCE) 510. One or more applications 505 that set cookies to be discovered and managed are also depicted. Typically, an application 505 is a web application, but this is not a limitation. Depending on implementation, some of these components (e.g., the CEO, CCE, and CPE) may be integrated with one another, or may leverage functionality from other systems. Some components may be co-located. A particular component may itself have sub-components that comprise the component functionality. Thus, a skilled person will appreciate that the block diagram depicted is provided for exemplary purposes and that the particular configuration shown is not intended to be limiting.

In general, and as will be described, the cookie evaluation orchestrator 502 manages the execution of the other components and flow of data among them. Typically, this component is implemented as a simple workflow engine that encapsulates the core flow described below; the CEO may implement alternative/additional flows as appropriate. Generally, the CEO 502 is responsible for assuring that inputs and outputs are marshaled as appropriate, and for maintaining the overall system state. In one embodiment, the CEO implementation evaluates cookies on a by-command basis; an alternative provides a more sophisticated operation, supporting multiple, concurrent, scheduled cookie evaluation(s) at an enterprise level. Further, preferably the CEO 502 is also responsible for adding new cookies or sources to the cookie registry 506 as appropriate.

In general, CDE 502 is used to discover cookies. CCE 510 is used to characterize the discovered cookies. CR 506 stores the discovered cookies, and their associated characterization information. CPE 508 is used to apply policy to cookies discovered by the CDE 502 and characterized by the CCE 510. Each of the operations is now described in further detail.

Figure 6:
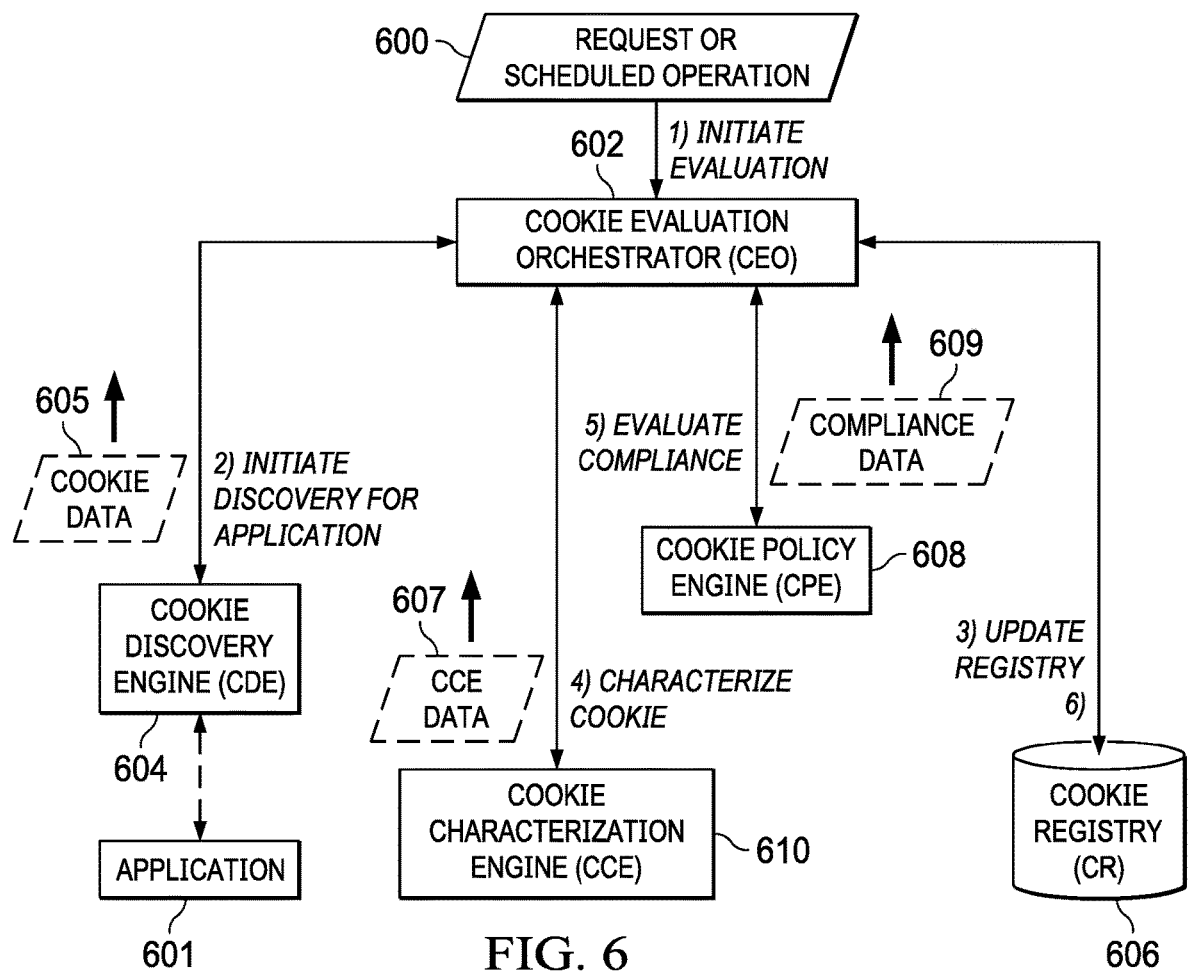
FIG. 6 depicts a high level overview of the operation of the cookie evaluation orchestrator components of the cookie compliance management system.

FIG. 6 depicts representative interactions and processing flow managed through the CEO. At step (1), which may be request-driven or otherwise scheduled, an operation is triggered for an application (source) 600, initiating the evaluation process. At step (2), the CEO 602 invokes a discovery function with a request to the CDE 604. The CDE 604 interacts with the application 601, and then returns the set of one or more observed cookies that were set by the application. This is the cookie data 605. At step (3), a cookie or source previously unregistered is added to the cookie registry 606. At step (4), and for each of one or more cookies, a cookie characterization engine (CCE) 610 is invoked to analyze the cookie and to create an appropriate set of attributes characterizing it. The set of attributes are CCE data set 607. At step (5), and using the CCE result as input, the policy engine 608 evaluates compliance of each cookie against a defined set of one or more policy rules. The result is compliance data 609. At step (6), the compliance result from the policy engine 608 is then recorded in the cookie registry. This completes the process. Although not depicted, the CEO can perform other functions as appropriate, such as audit logging, notification, or report generation.

The following provides additional details regarding each of the above-identified components of the system. As noted, the cookie discovery engine (CDE) provides the ability to detect which cookies are being set for a given application/scenario, including all attributes at the time the cookie is created. In the context of a web application, one preferred way to determine what cookies are being set is to actually execute the application in a user context, including authenticating as required, and then interacting with the application as appropriate to cause cookies to be set. To this end, a reliable way to know all cookies being set at a user's browser is to have the CDE functionality capture that information directly at the browser. An alternative approach is to implement the CDE in (or as) a proxy, which then captures cookies set through "Set-Cookie" HTTP headers that pass through the proxy. Still other approaches to implementing the CDE functionality are via script injection, e.g., by using JavaScript to scan a document.cookie object, by using a cookie API (e.g., via use of an "OnChanged" event), or by using XHR requests to capture Set-Cookie headers. As these approaches may differ in the specific cookies that can be detected, the particular approach that is utilized may thus be implementation-specific. In a preferred embodiment, the CDE engine is implemented as a cookie discovery plugin running in the context of a browser. The browser may execute in an automated mode (for example using Selenium web automation tools) with scripted login and application navigation as required, so that discovery itself could be automated. Tools such as Selenium support automated driving of many common browser implementations. Still another alternative is a purpose-built browser with the appropriate mechanism built-in.

More generally, the CDE provides for automated cookie discovery for support of the cookie compliance management solution, and it further enables discovery to be done as an audit function. This (automated regular discovery) is advantageous, such as in the context of an application continuous integration and deployment (CI/CD) pipeline. Such an implementation is not intended to be limiting. As will be described, cookie discovery, combined with the other elements of the management system, allows interested parties (e.g., application developers) to be tied more directly to the process of understanding how cookies affect entities outside of an application, and thus if necessary to remediate issues at their source.

Figure 7:
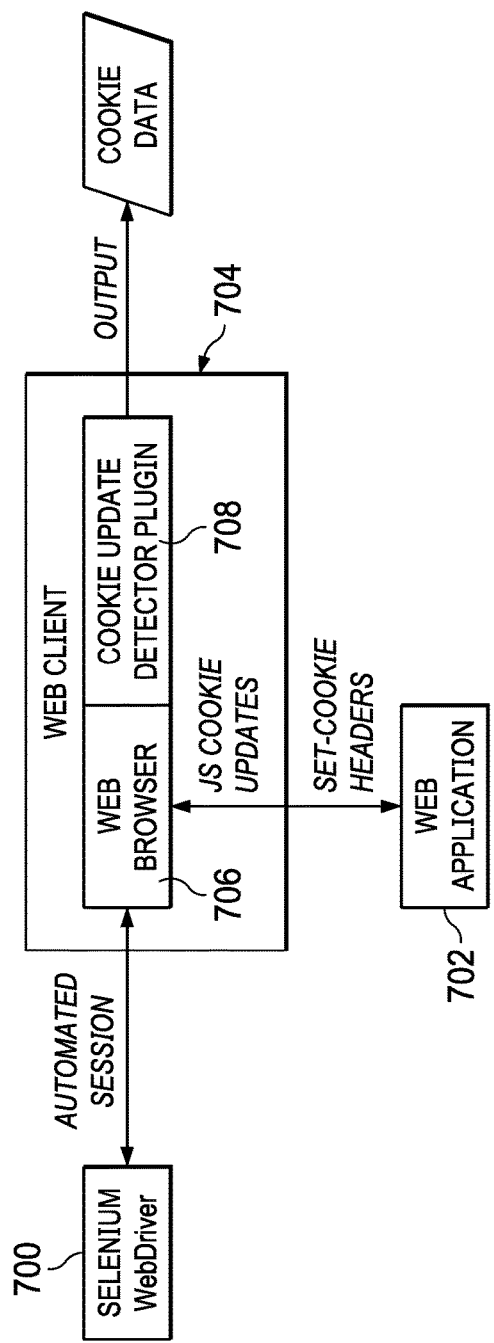
FIG. 7 depicts a representative implementation of the cookie discovery engine (CDE) components of the management system.

FIG. 7 depicts one implementation of a discovery component built around the use of a browser automation using a tool, such as Selenium. This implementation is merely representative. As is known, the Selenium WebDriver 700 allows an automated, scripted set of operations to be performed against a web application 702. As required, the scripting can be tailored to the needs of the particular application/use-case. Additionally, and with such a mechanism, cookie compliance testing advantageously can be performed in the context of a CI/CD flow, for example, an application team can directly integrate cookie compliance testing into their process. As shown, and in this example embodiment, a web client 704 is configured to execute a web browser 706 in the usual manner. To capture the cookie data, a cookie update detector plugin 708 is utilized; this plugin provides access to the browser cookie data store in a known manner, but preferably it is customized to facilitate the cookie management operations herein. To this end, the plugin 708 is executed to forward discovered cookies to other components of the solution. In particular, the plugin 708 is configured to capture data about cookies when they are set and to provide this information in a form (such as a JavaScript Object Notation (JSON) or similar data representation) that is suited to downstream evaluation. As noted above, this downstream evaluation involves providing cookies (and their captured settings) to the cookie registry, and evaluating the discovered cookies for compliance with one or more policies.

The CDE operation depicted may be implemented as a SaaS offering with a request/queuing mechanism or, more conventionally, it is implemented as a locally installable package/service. The CDE operation may also be carried out by known mechanisms that perform scans in conjunction with login and navigation.

Turning now to the cookie registry (CR), preferably this component is implemented in a data store, which may be in-memory. The registry may be implemented as a database in a database system. Preferably, the cookie registry maintains persistent data relating to the compliance system including, without limitation, known cookie names, sources, compliance statuses, and associated metadata. In the context of compliance, the registry preferably represents known cookies by their names, relates those names to the source(s) that sets them, and also includes relevant metadata describing each cookie-source combination (path, domain, lifetime, value characteristics, and other settings), as well as its evaluated compliance status. Working in conjunction with a discovery mechanism (the CDE, as described above), the cookie registry provides the core data to enable the system to understand not only what cookies are being set across the applications/services against which discovery has been performed, but also (in conjunction with the policy engine) to identify potential issues with them.

In one embodiment, the registry stores the following information about cookies which have been discovered: name; source(s) (i.e., "who" sets the cookie); per source data, namely, content (value) from a latest discovery scan, type (session vs persistent), lifetime (if persistent, observed lifetime), and settings (secure/http only/domain/path); and per source compliance data: compliance status. Additional metadata may also be maintained in the registry. Some non-limiting examples are: method (how is the cookie set—via Set-Cookie or JS); and content characteristics. The content characteristics typically are based on observed content value(s), and this metadata answer the following types of questions: what type of value do we believe it to be? Does it appear to be encrypted/b64 encoded/URL encoded? Does it appear to be JSON or some other structured value? Does it appear to contain personal data? These are merely representative.

Figure 8:
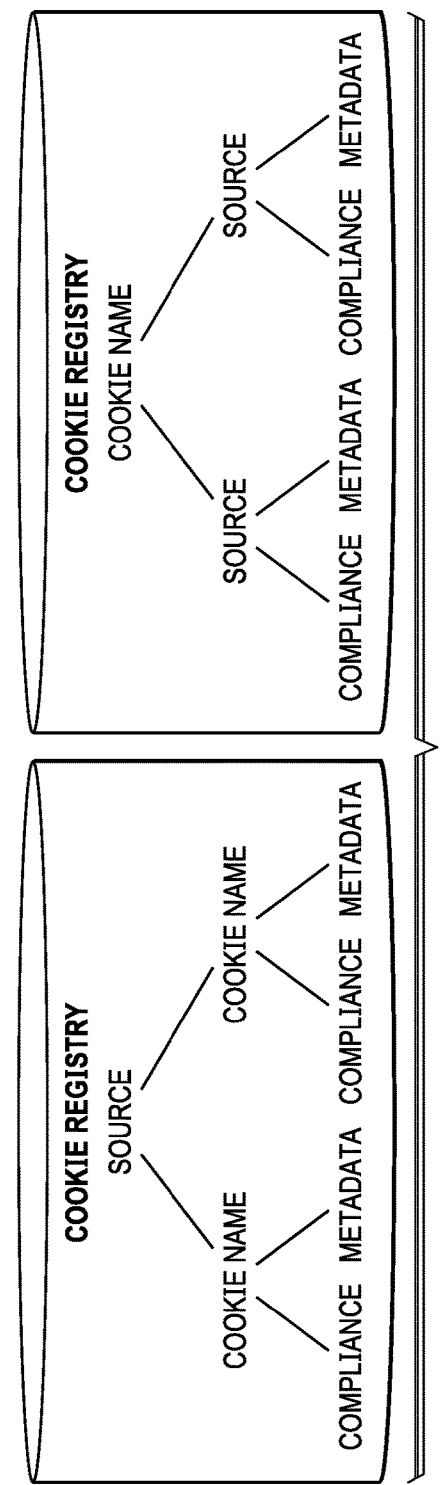
FIG. 8 depicts several examples of attribute mappings in the cookie registry of the management system.

Depending on implementation, the registry encapsulates relationships among the entities to facilitate characterization and policy evaluation. Thus, for example, the top portion of FIG. 8 is a name-to-source mapping that depicts the relationship of multiple sources to common cookie names. In particular, this portion of the cookie registry can be used (e.g., by the policy engine) to answer a query (e.g., given a cookie name, what sources set it, and what is their compliance status?). The bottom portion of FIG. 8 depicts an inverse mapping (namely, source-to-cookie name) and thus is useful to answer a query (e.g., given a source, what cookies does it set, and what is their compliance status?). These mappings are merely representative.

In addition to enabling compliance assessment flow, the cookie registry supports reporting, and provides visibility to application owners and other stakeholders into how cookies are being utilized across an enterprise.

Turning to the policy engine, as noted above the PE is configured to encapsulate applicable policies (rules) related to cookies, and it functions to evaluate compliance of a given cookie instance against these policies. The following policy categories may be incorporated or instantiated in the policy engine: known cookie standards (e.g., RFC 6265, etc.); applicable legal restrictions (e.g., GDPR, etc.); enterprise-specific cookie policies, such as naming standards, anti-collision policies, etc.; and other custom policies, where such policies may be dynamically updated as required. An example of a customizable, enterprise-specific policy might be a policy that includes one or more requirements/policy rules, such as: cookie names must comply with a defined naming standard; reserved cookie names may not be used; unapproved cookies may not be set with a domain setting of the top-level company domain; cookies that contain certain types of values must be encrypted; cookie content values must not exceed a certain length; a cookie set for a lower-level domain/host must not use a cookie name that is the same as a cookie defined for a higher-level domain; cookies must utilize an appropriate path setting; certain cookies, such as those used for tracking sessions, must have appropriate security settings enabled; certain persistent cookies may not have permitted lifetimes beyond a configurable limit, and so on. Policy rules may be specific to a particular policy type/class. The above examples are merely representative, as there is no requirement that any particular policy or policy rule or policy type be implemented.

Typically, a policy is represented in any number of ways, as appropriate for the specific policy engine implementation.

In one embodiment, a Policy Specification Language is used. Also, XACML and EPAL exemplify known mechanisms for representing and evaluating these types of policies. Generalizing, the specific policy/rule specification and evaluation mechanism is an implementation choice.

In operation, the policy engine accepts several inputs, preferably attributes representing a specific cookie, and computed attributes generated by the cookie characterization engine (CCE). In evaluating these inputs against one or more defined policies, the policy engine preferably is configured to determine whether the cookie is compliant, along with additional information as appropriate. The output from the policy engine varies based on implementation but typically includes one or more of the following: a compliance indication (yes/no); an indication(s) of deviation from policy; and guidance on how to address a compliance issue. In one embodiment, the PE output provides a text description regarding why the cookie is not compliant. Preferably, the output is provided to a requestor in a consumable form, such as a JSON data representation.

Figure 9:
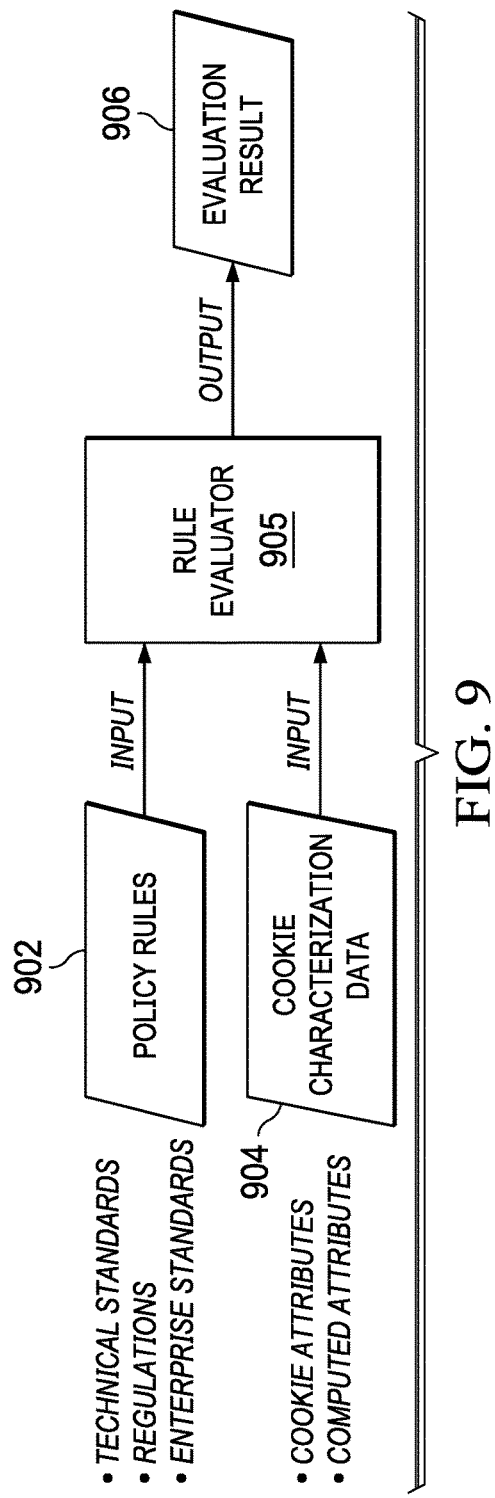
FIG. 9 is a process flow depicting an operation of the policy engine (PE) according to the techniques of this disclosure.

FIG. 9 depicts a representative logical structure of the policy engine. As depicted, policy rules 902, which are preferably represented using an appropriate specification language, comprise several possible types such as technical standards, regulations, enterprise standards, and so forth. These rules encapsulate the set of requirements that must be met for a given instance of a cookie to be considered compliant. The cookie characterization data 904, generated by the cookie characterization engine (CCE), provides the other input for the PE to evaluate the compliance of one or more cookies. As a skilled person will appreciate, typically the rules 902 and CCE data 904 are inherently tied together in that to be able to evaluate a rule, the engine must have access to the data required. This is another way of saying that a particular compliance determination typically is only as good as the rules that are defined and the accuracy of the cookie data provided. In an alternative embodiment, a rule dynamically obtains descriptive data as needed. A rule evaluator 905 receives these inputs, and outputs an evaluation result 906.

The remaining component is the cookie characterization engine (CCE). As noted above, for the policy engine to evaluate a cookie against one or more defined policies, the PE typically requires attribute data that characterize the cookie in a form amenable to policy evaluation. The specific set of attributes required depends on the data requirements of the policies. To this end, and using a set of "evaluator methods," the cookie characterization engine (CCE) computes a variety of attributes related to a cookie, thereby creating the necessary inputs for the policy engine. In a preferred embodiment, the CCE provides a JSON result, which is then sent to and acted upon by the policy engine as depicted in FIG. 9. Data input to the CCE typically includes the set of cookie attributes obtained through discovery. The CCE, however, is not limited to these inputs, and it may also utilize other data sources as appropriate.

Examples of base attributes that the CCE sets for a given cookie include, without limitation: cookie name, source (i.e. who set this cookie?), name length, content, content length, type (session/persistent), cookie lifetime if persistent, security or other transport indicators, path, domain, and the like. When most of the base attributes are already provided through discovery, the CCE still provides value by performing more sophisticated analysis and providing the PE with more in-depth information (sometimes referred to as additional "extended" attributes). These additional attributes are determined by one or more custom evaluators and may include, without limitation: whether content encoding is used (and, if so, what type), content type (URL, JSON, plain text, image, UUID, simple identifier, email address, name, number, multiple fields with separator, etc.); an indication that the cookie is set by multiple sources (e.g., because the CR shows additional sources for this cookie); other observations regarding how the cookie relates to other cookies set by the same source or by other sources (numbers of cookies set, measures of commonality for domain, path, etc.); an indication in conjunction with a consent data source whether the cookie is covered under an existing consent policy, and set forth. The CCE may implement statistical methods, heuristic techniques, machine learning, and the like, as required or desired. The particular CCE implementation is not a requirement, as a set of CCE evaluator methods preferably will be implementation-specific.

Figure 10:
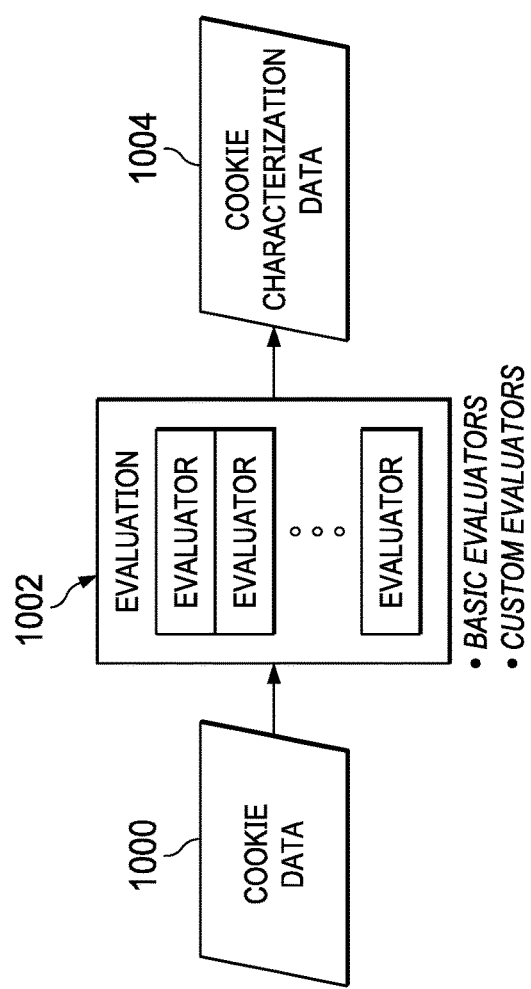
FIG. 10 depicts an operation of the cookie characterization engine (CCE) of the management solution.

In general, and as depicted in FIG. 10, any CCE implementation that accepts as input the attributes of a cookie (or set of cookies) 1000, analyzes cookie attributes via one or more evaluator methods 1002, and computes an output as a set of one or more descriptive attributes about the cookie 1004, will suffice. Preferably, the output 1004 (the resulting descriptive attributes) is provided in a form consumable by the policy engine (for example, a JSON data representation). The CEO (orchestrator) receives the cookie data 1000 from the CDE, and provides this input to the CCE. For each cookie input, a set of one or more evaluator methods 1002 is executed against its various attributes, deriving new attributes which further characterize the cookie. The evaluator methods can be implemented in a variety of ways, such as by a modular, plug-in system that allows extensibility with custom evaluator modules. The output of an evaluator method is metadata that is incorporated into the set of CCE outputs. Once all evaluations for all input cookies have been performed, preferably a serialized data structure containing the resulting data attributes is output for downstream consumption. As noted, JSON exemplifies an appropriate structure for this data, as it can represent information in a flexible, compact, extensible way, and it is easily consumable.

The CCE may consult the cookie registry for additional input data as appropriate for the analysis. As previously noted, the CCE function can be combined with another component. For example, the CCE function may be implemented within a CDE or PE component.

The management solution provides thus uses a cookie discovery engine coupled with analysis of cookies, policy engine, and cookie registry for enterprise compliance management. The approach herein enables deep analysis of cookie content values in the context of compliance evaluation. The approach also enables correlation of cookie data from multiple sources in conjunction with compliance policies (for example, to detect collision scenarios).

The techniques herein may be implemented in a variety of scenarios. In one embodiment, the above-described mechanism is implemented as an on-premises capability to assess, track and manage cookie policy compliance, e.g., directly integrated with an organization's overall IT processes. An alternative implementation is as a Software-as-a-Service (SaaS) offering, e.g., supporting regulatory, technical standard, and custom policy cookie compliance assessment. Yet another implementation is as a self-contained tool, e.g., useable by development teams or the like. As a SaaS-based offering, all or portions of the solution may be hosted in a cloud computing infrastructure. Further, given functions or components of the solution may be integrated with other systems, products, services, devices, appliances, programs or processes.

The various functional components of the solution typically are implemented as software, namely, a set of computer program instructions executed in one or more computer processors (e.g., hardware, virtual machines, or the like).

EXAMPLES

The following section describes several example evaluation scenarios for cookies that are discovered using the approach herein.

A first example is an obfuscated security token 1100, such as depicted in FIG. 11. At first glance, it may appear this value is not problematic. Depending on applicable policies, however, this may not be the case. In particular, several initial observations about the cookie content (value) are that it is relatively lengthy, it is not likely a simple identifier (given that length), and based on the pattern of the data, it appears likely to be base64-encoded. As such, an attempt to decode the cookie may be implemented. Trying base64, a decoded form of the cookie is then obtained as 1102, as also depicted. As can be seen in the decoding form, there is a clear pattern in this value, namely, it contains three (3) sections separated by periods. Further, the first two sections show a tell-tale pattern of an encoded JWT header, payload and signature data. This can be confirmed by decoding the first section, where the result 1104 is shown. Thereafter, and after base64-URL decoding the second section, the result is depicted as 1106. Examining the content of the JWT payload, it is observed that there are multiple fields which contain apparent personal data, that based on the audience value, that data is intended for use by the "abcApp" application, and further that the token has a one (1) year validity. Given the evaluation, the CCE may then characterize this cookie's content through various attributes. A representative (but non-limiting) example characterization is depicted in FIG. 12.

Continuing with the example, assume that one or more policy engine rules would likely consider the use of security tokens in persistent cookies as problematic relative to EU regulations. Because this example cookie is persistent, it may be non-compliant, unless the application were to enforce consent for the cookie (which the CCE may also check for). That said, even if the cookie compliant on that basis, one or more specific enterprise policies may be in place regarding inclusion of personal data in plain text (obfuscated or not), which might then still render the cookie as non-compliant. Or, the value length may exceed some defined enterprise maximum. There are just example policies (or rules associated with a particular policy).

As noted, cookies values (and formats) vary greatly, but the CCE is configured to be able to identify and analyze a wide range of value patterns. Using this approach, and depending on implementation, the CCE provides a wide range of policy analysis, including potentially deep analysis to characterize cookies. For example, and using entropy analysis (e.g., using a Shannon entropy calculation), the CCE may be configured to assess the likelihood of obfuscation versus encryption versus hashing. Where obfuscation is suspected, common techniques (such as XOR/packing/B64/ROT13) can then be tested to see if underlying data can be determined. Also, common structured value schemes should be detectable using appropriate pattern identification/matching techniques.

A second example scenario involves cookie collision. In this example, assume there are two (2) applications, appA and appB, each setting a cookie with the name "MyCookie." Prior analysis of this cookie from appA resulted in information 1300 being recorded in the cookie registry, as depicted in FIG. 13. Assume also that appA's instance of this cookie has been evaluated earlier as compliant but that, at a future time, appB is scanned for cookie compliance, and a cookie with the same name is found. The information for this second cookie is depicted as 1302. This creates an interesting collision scenario. Typically, cookie-handling standards do not specify precedence evaluation based on domain (as is the case for path). This means that a browser that identifies more than one cookie applicable to a request based on domain value is free to handle it in any manner it chooses. For example, it can include: all matching cookies in the request in any order; all matching cookies but in the order of most-to-least specific domain value; only the cookie with the most-specific domain value; only the cookie with the broadest domain value, or some other variant. It is known that browsers behave differently with respect to handling this type of scenario, with some returning different results, or returning all values in an unspecified order. Typically, the behavior in such a scenario is application-dependent. That said, if an application uses a cookie that is not meant for it, there can be unexpected results, and these types of situations are actually more common, especially for cookies with well-known names that are used by multiple applications. A variation of this scenario would be a situation where the same cookie name, domain, and path are set by multiple applications. In this case, users can encounter applications overwriting cookies set by other applications, again resulting in unexpected client behaviors.

Preferably, and for enforcement, one or both of these cookies should be changed to avoid issues. Which one is out of compliance, however, depends on what the policy is. Thus, for example, if the policy rules indicate that "MyCookie" is a reserved name and cannot be set within a lower-level domain, then appA's cookie is now non-compliant (even though when it was previously scanned, MyCookie was not a reserved name). If, however, the policy rules specify that a non-reserved cookie name cannot be used in the organization's top-level domain, then appB's cookie is non-compliant. These are just representative (non-limiting) rules in the policy. In either case, this is a potential "collision" scenario that can then be corrected. By being tied to a defined cookie policy, the technique herein thus facilitates the ability to notify, track, and manage enforcement in the context of overall IT compliance.

A third example scenario involves third party cookies. In particular, a significant percentage of applications include third party components for tracking or other purposes in their web templates, which may themselves set cookies. When performing cookie discovery for a given source, it is possible to detect these cookies being set, relating them not only to the third party as a distinct source, but also to the application source itself. This permits evaluation of compliance policies related to how applications may utilize third party components which themselves set cookies. Also, for reporting purposes alone, the ability to simply characterize what applications are using third party components that set cookies is valuable.

A final example involves discovering and enabling enforcement of consent requirements. In this example scenario, it is assumed that the enterprise must be compliant with the EU's GDPR and other emerging regulations that drive the need to obtain increasingly-specific user consent for setting of cookies. While there are "essential" cookies that may not require user consent in many cases, most organizations use many others that do require consent, and it can be important to assure that discovered cookies utilize appropriate consent mechanisms. Continuing with this example, assume a discovered cookie that is named "This-Cookie," where the cookie is persistent with a lifetime of, say, six (6) months. The value in the cookie is examined and appears to be a set of identifiers representing what look like product categories, such as: DataStorage|Security|Analytics. In this example, and using the approach described, assume that the CCE detects that the value appears to match certain known keywords related to the business, and it provides this information in its characterization response. The CCE may also be configured to perform a check against a third party cookie consent service to determine if this particular cookie name is covered under a consent requirement, and if so, to determine whether such consent been granted to set this cookie for the test user under which the CDE performs discovery. Per regulation, the policy engine is configured to determine that this particular cookie may require consent based on the observed characteristics. If no such consent exists, then the cookie is considered not to be compliant. This determination is then used to categorize the cookie and feed it into a known cookie consent management solution.

The techniques described herein provide significant advantages. Generally, the techniques provide automated and efficient methods to discover how cookies are used for web applications across an enterprise, and to determine whether they are being used in compliance with organizationally-relevant standards. The approach herein does not create security exposures, assures compliance with applicable governmental regulations, and minimizes technical issues, especially with respect to the common scenario wherein applications use cookies within a common domain.

A further advantage of the approach herein is that is enables an enterprise to establish (and enforce) an internal enterprise cookie standard for applications, and this can be very helpful in enabling the enterprise to meet its privacy and security objectives. An internal cookie standard may go well beyond cookie formats (such as specified in applicable Internet RFCs, or other regulatory requirements), and to provide support for additional attributes, such as security settings guidance, cookie naming conventions, reserved names, length restrictions, value governance (e.g., permitted content/usage, privacy considerations, encoding/encryption requirements, etc.), and path/domain requirements.

The technique of this disclosure advantageously provides for tooling to track the use and compliance of cookies within enterprise environments, regardless of their size and IT diversity. As has been described, the approach does not interfere with the ability of applications to have freedom to create the cookies they need to successfully function, but it enables the enterprise to have assurance that an application creates cookies in a way that minimizes the possibility of interference with cookies set by another application or service, which would otherwise create security exposures, and/or run afoul of government regulations.

Further, the techniques herein enabling cookie compliance checking and management with visibility at several levels within the enterprise, thereby supporting the above-described privacy and security objectives for many different types of enterprise constituents. These include development teams, which perform cookie compliance checks within the context of a continuous integration and deployment (CI/CD) pipeline, CISO or internal privacy groups, which provide IT compliance oversight by utilizing cookie compliance information to assure policies are consistently enforced, as well as legal review personnel, who leverage cookie compliance data to assess potential exposures of a business to regulatory concerns. The techniques herein provide for an integrated holistic approach to enterprise cookie compliance management. The approach may operate in a manner complementary to, or integrated with, regulatory-focused systems.

The techniques herein may be implemented in an on-line or, more preferably, in an off-line model. The approach does not require real-time evaluation against live end user traffic, and therefore it does not introduce additional dependencies. The approach further enables implementation of compliance management within engineering flows, thereby avoiding needing to address issues after-the-fact.

As has been described, the solution herein provides a mechanism to discover how cookies are used for web applications across an enterprise and to determine whether they are being used in compliance with organizationally-relevant standards. This approach may be used in conjunction with a direct mechanism for enforcement. There are many known enforcement capabilities that may be implemented and that complement the disclosed subject matter. Such mechanisms include, without limitation, access-based control systems, policy-based management systems, systems that provide feedback to application/content developers allows them to correct issues at the source, and so forth. There is no requirement that particular type or method of enforcement be used. Enforcement may be on-line or off-line, synchronous or asynchronous, active or passive.

Variants

Web storage is emerging as an alternative to using cookies, and thus the techniques herein may be extended to support compliance management with respect to such operating scenarios that intersect with cookie policies. To support web storage-based implementations, the discovery mechanism as described herein is extended to include objects in browser storage, such as localStorage and sessionStorage. The CCE analysis is configured to support analysis (including deep analysis) of values that are retrieved from such storage. Policy rules are to include web storage objects, which have several different characteristics. For example, in this context the "collision" scenarios as described above are a bit different (they exist in scenarios where multiple applications are served through a common origin), and name length or syntax restrictions (or other policies that are appropriate for cookies) may be adjusted accordingly. The cookie registry is extended to incorporate tracking of web browser storage in conjunction with specific sources. Preferably, the registry is also configured to associate a given source with all of the browser entities it creates, providing an overall, integrated view of how it utilizes these mechanisms.

Other Enabling Technologies

The functionality described above may be implemented as a standalone approach, e.g., a software-based function executed by a processor, or portions of it may be available as a managed service (including as a web service via a SOAP/XML or JSON interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the above-described components are implemented in a special purpose computer, preferably in software executed by one or more processors. The software is maintained in one or more data stores or memories associated with the one or more processors, and the software may be implemented as one or more computer programs. Collectively, this special-purpose hardware and software c provides the functions, as has been described above.

The techniques herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The term "cookie" should be broadly construed to refer to an HTTP cookie (RFC 2109) or, more generally, any data structure that includes session-specific data associated with the server-side instance that returns that data structure.

What we claim is as follows:

1. A compliance management system, comprising:
   a discovery engine configured to identify a hypertext transfer protocol (HTTP) cookie set by an application and a set of one or more base attributes associated with the HTTP cookie;
   a characterization engine configured to characterize the HTTP cookie by a set of one or more descriptive attributes required to evaluate the HTTP cookie according to a policy, wherein the set of one or more descriptive attributes associated with the HTTP cookie are calculated based on the set of one or more base attributes identified by the discovery engine; and
   a policy engine configured to apply the policy to the HTTP cookie identified by the discovery engine and characterized by the characterization engine;
   wherein the discovery engine, the characterization engine, and the policy engine are configured to execute in an automated manner as software in one or more hardware processors.

2. The compliance management system as described in claim 1, further including an orchestrator engine to manage the discovery engine, the characterization engine, and the policy engine.

3. The compliance management system as described in claim 1, wherein the policy is selected from the group consisting of: a cookie standard, an application legal restriction, and an enterprise-specific cookie policy.

4. The compliance management system as described in claim 1, further including a registry to store the HTTP cookie, the set of one or more base attributes, the set of one or more descriptive attributes, and a compliance determination output by the policy engine.

5. The compliance management system as described in claim 4, wherein the registry is queried by the policy engine to provide a response to a query.

6. The compliance management system as described in claim 5, wherein the query is a cookie name and the response is a source that set the HTTP cookie together with a compliance status.

7. The compliance management system as described in claim 5, wherein the query is a source, and the response is one or more HTTP cookies set by the source together with their compliance status.

8. A method to manage cookie compliance for an application in an enterprise computer environment, comprising:

identifying, by a discovery engine, a hypertext transfer protocol (HTTP) cookie set by the application and a set of one or more base attributes associated with the HTTP cookie;

characterizing, by a characterization engine, the HTTP cookie by a set of one or more descriptive attributes required to evaluate the HTTP cookie according to a policy, wherein the set of one or more descriptive attributes associated with the HTTP cookie are calculated based on the set of one or more base attributes identified by the discovery engine; and applying, by a policy engine, the policy to the HTTP cookie identified by the discovery engine and characterized by the characterization engine.

9. The method as described in claim 8, further including orchestrating, by an orchestrator engine, the discovery engine, the characterization engine, and the policy engine.

10. The method as described in claim 8, wherein the policy is selected from the group consisting of: a cookie standard, an application legal restriction, and an enterprise-specific cookie policy.

11. The method as described in claim 8, further including storing, in a registry, the HTTP cookie, the set of one or more base attributes, the set of one or more descriptive attributes, and a compliance determination output by the policy engine.

12. The method as described in claim 11, further including issuing a query, by the policy engine, to the registry and providing a response to the query.

13. The method as described in claim 12, wherein the query is a cookie name and the response is a source that set the HTTP cookie together with a compliance status.

14. The method as described in claim 12, wherein the query is a source, and the response is one or more HTTP cookies set by the source together with their compliance status.

15. A computer program product in a non-transitory computer readable medium for use in a data processing system to manage cookie compliance for an application in an enterprise computer environment, the computer program product holding computer program instructions that, when executed by the data processing system, are configured as:

a discovery engine that identifies a hypertext transfer protocol (HTTP) cookie set by the application and a set of one or more base attributes associated with the HTTP cookie;

a characterization engine that characterizes the HTTP cookie by a set of one or more descriptive attributes required to evaluate the HTTP cookie according to a policy, wherein the set of one or more descriptive attributes associated with the HTTP cookie are calculated based on the set of one or more base attributes identified by the discovery engine; and a policy engine that applies the policy to the HTTP cookie identified by the discovery engine and characterized by the characterization engine.

16. The computer program product as described in claim 15, wherein the computer program instructions include program code further configured as an orchestrator engine that manages the discovery engine, the characterization engine, and the policy engine.

17. The computer program product as described in claim 15, wherein the policy is selected from the group consisting of: a cookie standard, an application legal restriction, and an enterprise-specific cookie policy.

18. The computer program product as described in claim 15, wherein the computer program instructions include program code further configured to manage a registry to store the HTTP cookie, the set of one or more base attributes, the set of one or more descriptive attributes, and a compliance determination output by the policy engine.

19. The computer program product as described in claim 18, wherein the computer program instructions include program code further configured to control the policy engine to query the registry and to provide a response to a query.

20. The computer program product as described in claim 19, wherein the query is a cookie name and the response is a source that set the HTTP cookie together with a compliance status.

21. The computer program product as described in claim 19, wherein the query is a source, and the response is one or more HTTP cookies set by the source together with their compliance status.

* * * * *